（12）United States Patent
Day et al.

(10) Patent No.: US 10,115,029 B1
(45) Date of Patent: Oct. 30, 2018

(54) AUTOMOBILE VIDEO CAMERA FOR THE DETECTION OF CHILDREN, PEOPLE OR PETS LEFT IN A VEHICLE

(71) Applicant: Ambarella, Inc., Santa Clara, CA (US)

(72) Inventors: Christopher N. Day, Los Gatos, CA (US); Alexander Fink, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 239 days.

(21) Appl. No.: 14/882,007

(22) Filed: Oct. 13, 2015

(51) Int. Cl.
*H04N 7/18* (2006.01)
*G06K 9/00* (2006.01)
*H04N 5/232* (2006.01)

(52) U.S. Cl.
CPC ..... *G06K 9/00832* (2013.01); *G06K 9/00771* (2013.01); *H04N 5/23229* (2013.01)

(58) Field of Classification Search
CPC .......... G06K 9/00832; G06K 9/00771; H04N 5/23229
USPC ......................................................... 348/40
See application file for complete search history.

(56) References Cited

U.S. PATENT DOCUMENTS

| 9,227,484 | B1* | 1/2016 | Justice | B60N 2/002 |
| 2002/0169583 | A1* | 11/2002 | Gutta | A61B 5/7264 |
| | | | | 702/188 |
| 2007/0183635 | A1* | 8/2007 | Weidhaas | B60R 25/25 |
| | | | | 382/118 |
| 2008/0245598 | A1* | 10/2008 | Gratz | B60R 25/1004 |
| | | | | 180/287 |
| 2010/0305816 | A1* | 12/2010 | Orlewski | B60R 21/01516 |
| | | | | 701/45 |
| 2011/0134245 | A1* | 6/2011 | Khizhnichenko | G06K 9/00771 |
| | | | | 348/148 |
| 2015/0043745 | A1* | 2/2015 | Juzswik | H04B 1/00 |
| | | | | 381/86 |
| 2016/0272112 | A1* | 9/2016 | DeGrazia | B60Q 9/00 |

\* cited by examiner

*Primary Examiner* — Sathyanaraya V Perungavoor
*Assistant Examiner* — Peet Dhillon
(74) *Attorney, Agent, or Firm* — Christopher P. Maiorana, PC

(57) ABSTRACT

An apparatus comprising a camera sensor and a processor. The camera sensor may be configured to generate a video signal based on a targeted wide angle view of an interior of a vehicle. The processor may be configured to detect a type of object in the interior of the vehicle based on a classification of information visible in the video signal. If the vehicle is unattended by a person capable of operating one or more accessories of the vehicle, the processor may be configured to initiate one or more corrective measures based on the type of the object.

20 Claims, 11 Drawing Sheets

AUTOMOBILE VIDEO CAMERA FOR THE DETECTION OF CHILDREN, PEOPLE OR PETS LEFT IN A VEHICLE

FIELD OF THE INVENTION

The present invention relates to video capture devices generally and, more particularly, to an automobile video camera for the detection of children, people or pets left in a vehicle.

BACKGROUND OF THE INVENTION

Objects, including children, people or pets are often left in the back seat of cars. Some drivers forget that the objects have been left behind and depart from the vehicle. Some drivers are not aware of the dangers of leaving such objects behind. Drivers can become distracted while running an errand outside of the vehicle or mistakenly assume that the objects will be safe because the temperature was comfortable when the vehicle was parked. The temperature in the car can rise quickly posing a health risk to the child, person or pet. Some objects might not have the capacity, or ability, to open the car door or window in case of an emergency.

It would be desirable to implement an automobile video camera for the detection of children, people or pets left in a vehicle.

SUMMARY OF THE INVENTION

The present invention concerns an apparatus comprising a camera sensor and a processor. The camera sensor may be configured to generate a video signal based on a targeted wide angle view of an interior of a vehicle. The processor may be configured to detect a type of object in the interior of the vehicle based on a classification of information visible in the video signal. If the vehicle is unattended by a person capable of operating one or more accessories of the vehicle, the processor may be configured to initiate one or more corrective measures based on the type of the object.

The objects, features and advantages of the present invention include providing an automobile video camera for the detection of objects left in a vehicle that may (i) operate when a vehicle is unattended, (ii) classify types of objects in a video signal, (iii) generate various corrective measures based on the detected object, (iv) distinguish between objects inside the vehicle and outside the vehicle, (v) ignore objects outside of the vehicle, (vi) determine a capacity and/or capability of the detected objects, (vii) wake up in response to external stimulus, (viii) test and/or confirm hypotheses about detected objects, (ix) trigger alerts, (x) alert emergency services and/or (xi) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
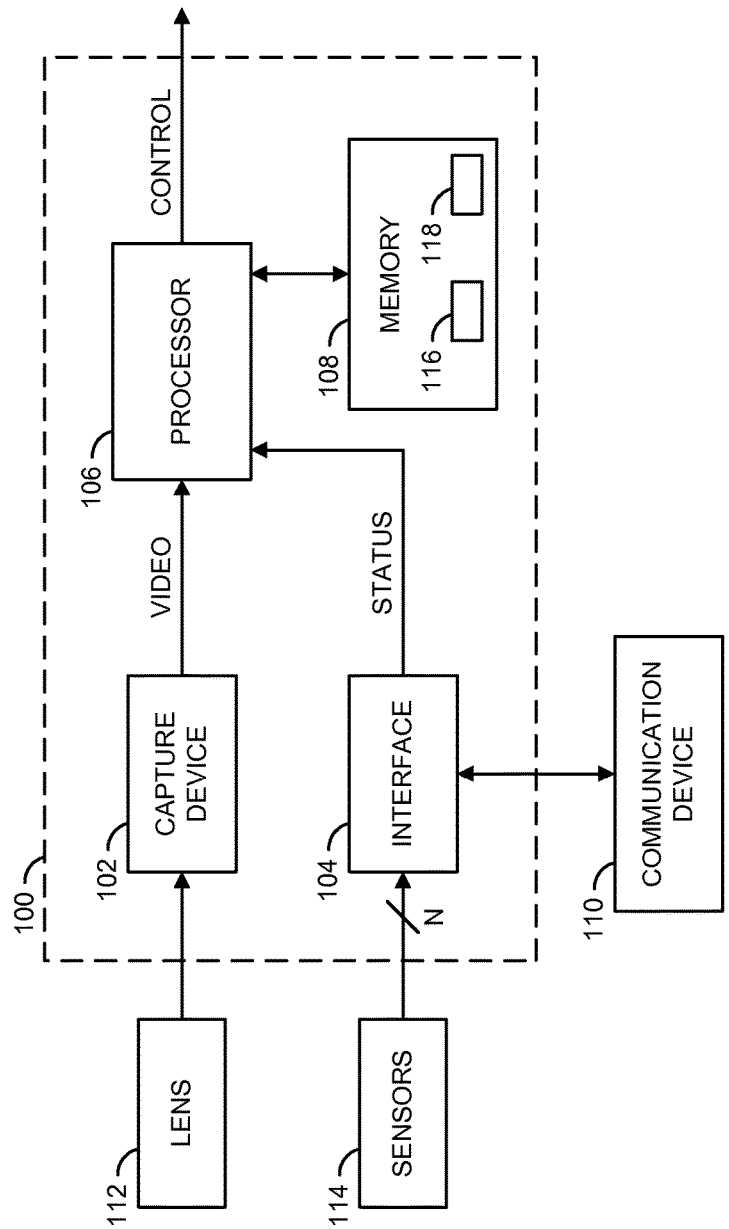
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, a block (or circuit) 104, a block (or circuit) 106 and/or a block (or circuit) 108. The circuit 102 may implement a capture device. The circuit 104 may implement an interface. The circuit 106 may be configured as a processor. The circuit 108 may be configured as a memory. The memory 108 may be configured to store computer readable/executable instructions (or firmware). The instructions, when executed by the processor 106, may perform a number of steps.

The apparatus 100 is shown connected to a block (or circuit) 110 and/or a block (or circuit) 114. The circuit 110 may be an external communication device. The circuit 114 may be implemented as one or more sensors (e.g., a location module such as a GPS sensor, an orientation module such as a magnetometer, a temperature sensor, etc.). Generally, the sensors 114 may be input/output devices separate from the capture device 102. In some embodiments, the communication device 110 and/or the sensors 114 may be implemented as part of the camera system 100 (e.g., internal components of the camera system 100). In some embodiments, the communication device 110 and/or the sensors 114 may be components available to the camera system 100 (e.g., pre-installed components of a vehicle).

The memory 108 is shown comprising a block (or circuit) 116 and a block (or circuit) 118. The circuit 116 may be configured as a lookup table. The circuit 118 may be a data storage portion of the memory 108. The memory 108 may comprise other portions (e.g., instructions, free memory, application-specific storage, shared memory, etc.). The type of data stored in the memory 108 may be varied according to the design criteria of a particular implementation.

The apparatus 100 is shown receiving input from a block (or circuit) 112. The block 112 may be a lens (e.g., a camera lens). In some embodiments, the lens 112 may be implemented as a part of the apparatus 100. The components implemented in the apparatus 100 may be varied according to the design criteria of a particular implementation. In some embodiments, the apparatus 100 may be implemented as a drop-in solution (e.g., installed as one component).

The capture device 102 may present a signal (e.g., VIDEO) to the processor 106. The interface 104 may present a signal (e.g., STATUS) to the processor 106. The interface 104 is shown receiving data from the sensors 114. The processor 106 may be configured to receive the signal VIDEO, the signal STATUS and/or other signals. The signal STATUS may present status information received from the sensors 114. The processor 106 may be configured to generate a signal (e.g., CONTROL). In some embodiments, the signal CONTROL may be presented to the interface 104 (e.g., to provide control information to various components of a vehicle). The inputs, outputs and/or arrangement of the components of the camera system 100 may be varied according to the design criteria of a particular implementation.

The apparatus 100 may be implemented as a regular digital camera and/or a depth-sensing camera. The sensors 114 may comprise a GPS, a magnetometer, a temperature sensor, a CO2 sensor, a passive infrared (PIR) sensor, a humidity sensor, etc. The sensors 114 may be implemented on-board the camera system 100 and/or connected externally (e.g., via the interface 104). The processor 106 may analyze the captured video content (e.g., the signal VIDEO) in real time to detect objects and/or determine corrective measures to apply in response to the detected objects (to be described in more detail in association with FIGS. 3-11).

Figure 2:
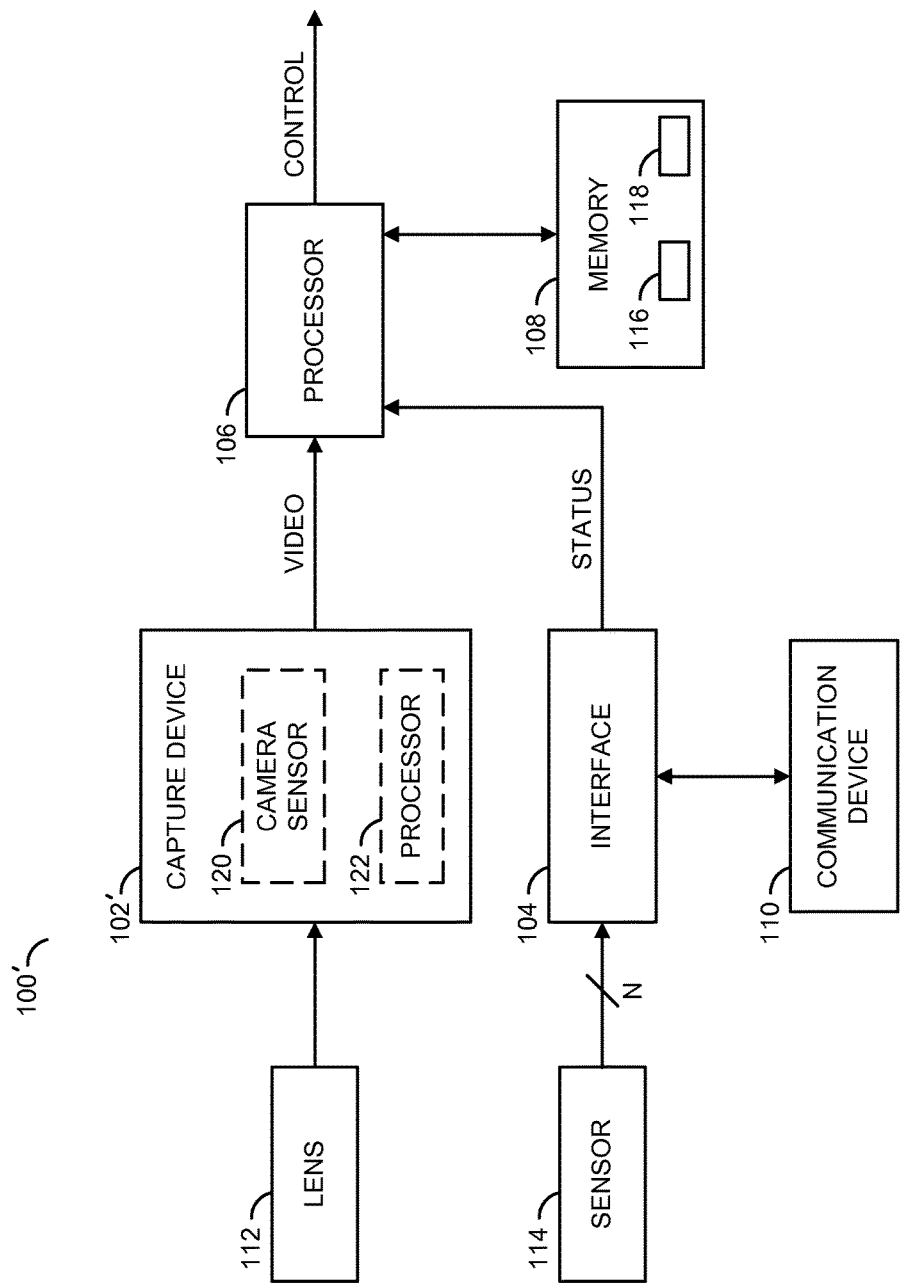
FIG. 2 is a block diagram of another example embodiment of an apparatus.

Referring to FIG. 2, a block diagram of the apparatus 100' is shown in accordance with an embodiment of the present invention. The camera system 100' may comprise the capture device 102', the interface 104, the processor 106, the memory 108, the communication device 110, the lens 112 and/or the sensors 114. The camera system 100' may be a distributed system (e.g., each component may be implemented separately throughout an installation location such as a vehicle). The capture device 102' may comprise a block (or circuit) 120 and/or a block (or circuit) 122. The circuit 120 may be a camera sensor (e.g., a camera sensor separate from the sensors 114). The circuit 122 may be a processor (e.g., a processor separate from the processor 106). The capture device 102' may implement a separate internal memory (e.g., a memory separate from the memory 108 such as a frame buffer).

Figure 3:
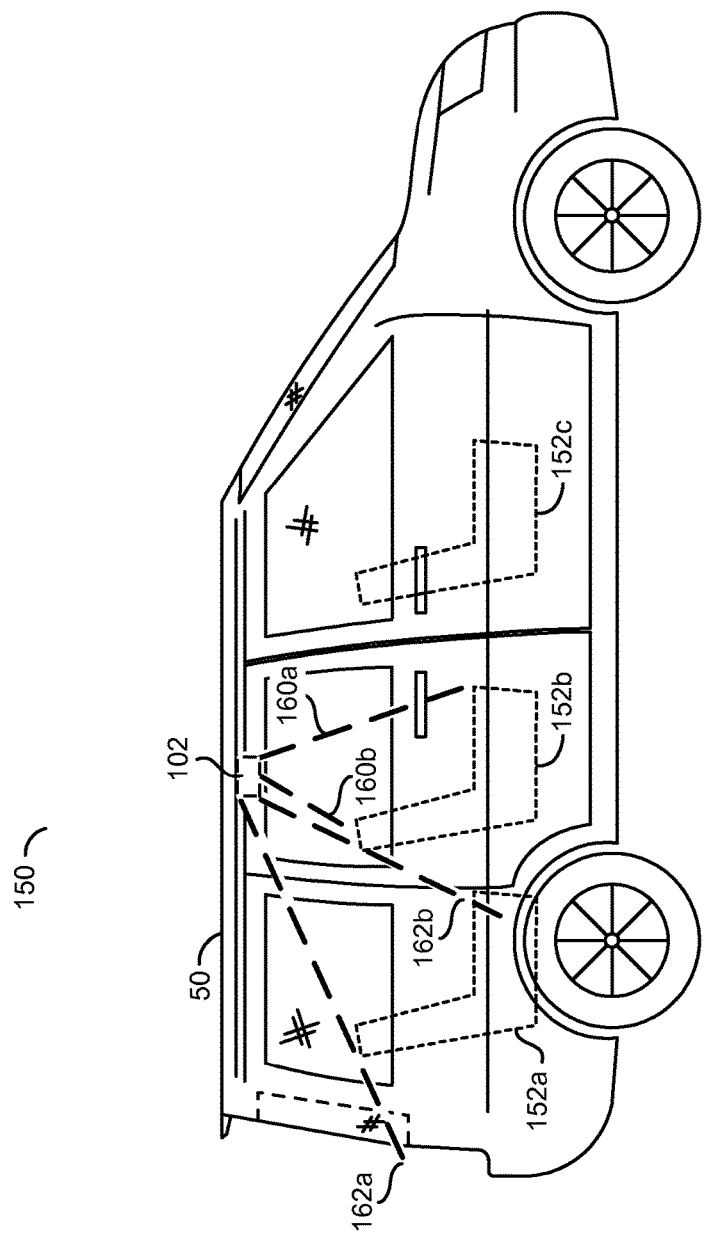
FIG. 3 is a diagram of various camera angles of an interior of a vehicle.

Referring to FIG. 3, a side view 150 of a vehicle 50 is shown. Various camera angles of an interior of the vehicle 50 are shown. Multiple rows of seats 152a-152c are shown in the vehicle 50. The number of rows of seats 152a-152c may vary depending on the design criteria of a particular implementation. For example, the row of seats 152b may represent the middle rows of seats (e.g., in a vehicle that has multiple middle rows of seats).

The capture device 102 is shown mounted on a ceiling of the vehicle 50. The capture device 102 is shown having an angle 160a and an angle 160b (e.g., a field of view) that points toward the middle row of seats 152b. The field of view from the angle 160a and the angle 160b may provide a targeted view of the interior of the vehicle 50. The capture device 102 is also shown having an angle 162a and an angle 162b (e.g., a field of view) that points toward the back row of seats 152a. The field of view from the angle 162a and the angle 162b may provide a targeted view of the interior of the vehicle 50. Other angles and/or fields of view may be captured by the capture device 102. For example, the capture device 102 may be further configured to capture the front row of seats 152c.

The multiple fields of view captured by the capture device 102 may be a targeted wide angle view of the interior of the vehicle 50. The number of angles and/or fields of view may be varied according to the design criteria of a particular implementation. The number and/or locations of the sensors 102 and/or the lenses 112 used to capture the various fields of view may be varied according to the design criteria of a particular implementation. In some embodiments, a single lens 112 and/or capture device 102 may be located at a front of the vehicle 50 to capture all the seats in the rows 152a-152c in the vehicle 50 in a single wide angle view. In some embodiments, multiple lenses 112 and/or multiple capture devices 102 may be located at various locations in the vehicle 50 to capture various angles of each of the seats in the rows 152a-152c. The targeted wide angle view of the interior of the vehicle 50 may be configured to capture video data corresponding to any object that may be occupying any of the seats in each of the rows of seats 152a-152c.

Figure 4:
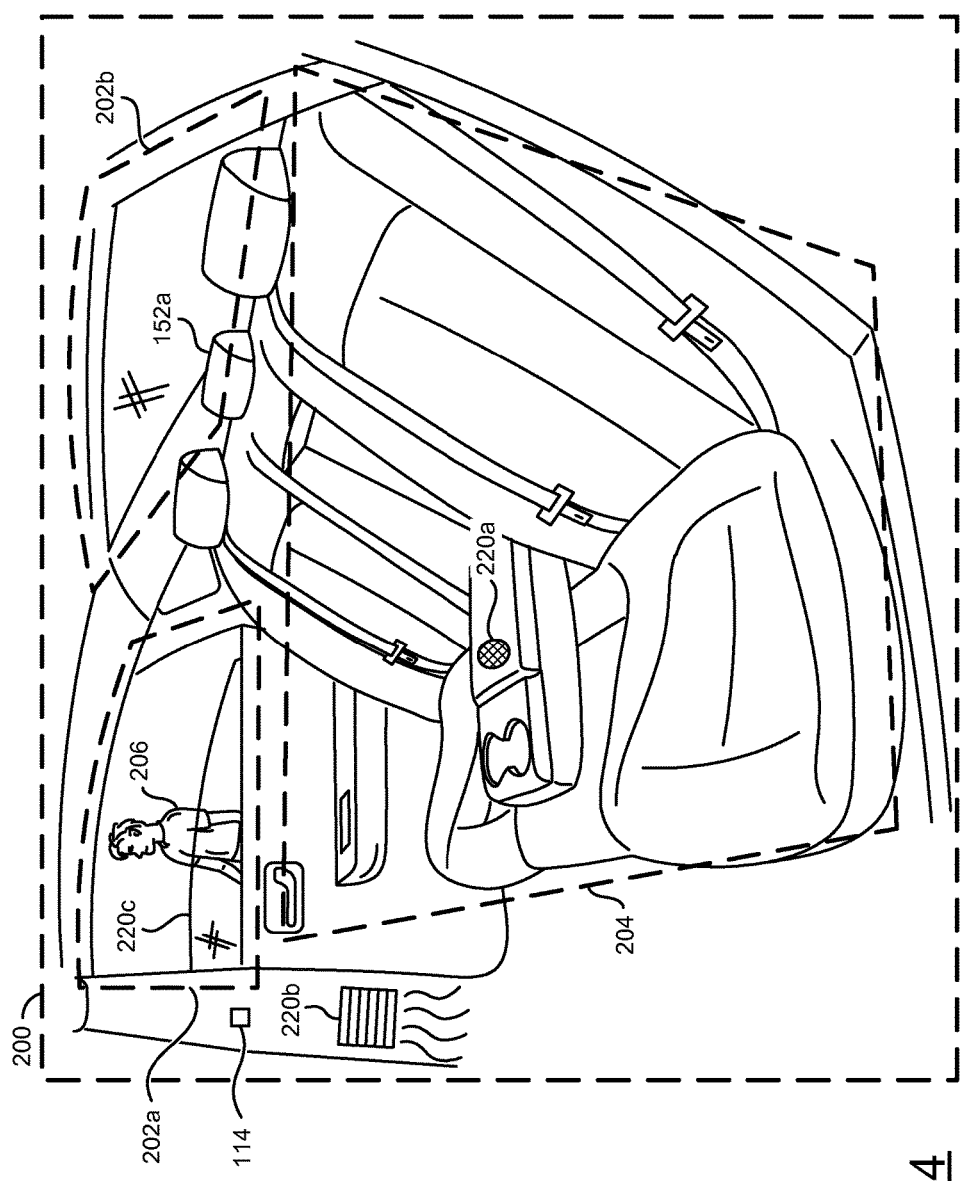
FIG. 4 is a diagram illustrating detecting reference objects in a video frame.

Referring to FIG. 4, a diagram illustrating detecting reference objects in a video frame 200 is shown. The video frame 200 may be video data (e.g., one example frame from a series of frames in the video data in the signal VIDEO) of the interior of the vehicle 50. The video frame 200 may be an example targeted wide angle view of the interior of the vehicle 50. The video frame 200 is shown directed at the back row of seats 152a.

The video frame 200 may be an example of reference frame. For example, the reference frame 200 may be used by the camera system 100 to learn the locations of various objects in the vehicle 50. The camera system 100 is shown detecting windows 202a-202b. For example, the locations of the detected windows 202a-202b may be used to train the camera system 100 to know where the detected windows 202a-202b are in the video frame 200. The camera system 100 is shown detecting a seat 204. The seat 204 may be used by the camera system 100 as a reference to determine where objects are in the video frame. For example, a non-moving object may be detected in the video frame 200 by comparing the captured video data with the video data from the empty seat 204 in the reference frame 200.

A person (e.g., an object) 206 is shown outside the detected window 202a. The camera system 100 may be configured to distinguish between objects in the interior of the vehicle 50 and objects outside of the vehicle 50. For example, the person 206 detected outside of the vehicle 50 may be filtered out and/or ignored (e.g., no corrective measure may be generated in response to the person 206).

Corrective measures 220a-220c are shown in the video frame 200. The corrective measure 220a may be a speaker (or two-way speaker). The corrective measure 220b may be a vehicle temperature control vent (e.g., part of a temperature control system of the vehicle 50). The corrective measure 220c may be a window (e.g., the detected window 202a). Other corrective measures may be implemented. The number and/or types of the corrective measures may be varied according to the design criteria of a particular implementation.

The two way speaker 220a may be used as one of the corrective measures (e.g., activated in response to the signal CONTROL). The two way speaker 220a (e.g., comprising a speaker and a microphone) may be configured to perform audio playback and/or capturing audio. For example, the audio playback from the two way speaker 220a may be a pre-recorded message. The message may prompt for a response. For example, the message may ask, "are you okay?" The two way speaker 220a may be configured to detect a potential response by capturing audio data. For example, the audio data captured by the two way speaker 220a may be used for speech-to-text audio processing to determine a level of control of a detected object based on the response received to the prompt.

The temperature control vent 220b may be used as one of the corrective measures (e.g., activated in response to the signal CONTROL). The temperature control vent 220b may be configured to control a temperature in the vehicle 50. The processor 106 may regulate the temperature in the vehicle 50 using the signal CONTROL (e.g., emit cool and/or warm air). For example, if a person is left unattended in the vehicle 50, the temperature control vent 220b may be used as one of the corrective measures to keep the person at a safe temperature.

The window 220c may be used as one of the corrective measures (e.g., controlled in response to the signal CONTROL). The processor 106 may be configured to raise or lower the window 220c. For example, if a person is left unattended in the vehicle 50, the window 220c may be lowered to lower the temperature in the vehicle 50, increase air flow through the vehicle 50 and/or allow easier access to the interior of the vehicle 50 for a potential rescuer.

One of the vehicle sensors 114 is shown in the frame 200. The sensor 114 may be configured to generate the signal STATUS in response to external stimulus. In one example, the sensor 114 may be configured as a temperature sensor. The signal STATUS may be generated to provide the processor 106 with a temperature measurement for the interior of the vehicle 50 (e.g., the status information). In another example, the sensor 114 may be configured as a CO2 sensor. The signal STATUS may be generated in response to CO2 levels (e.g., an indication that a person is breathing inside the vehicle 50). The camera system 100 may be configured to begin video recording and/or processing in response to the CO2 levels reaching a pre-defined threshold. In yet another example the sensor 114 may be configured as a PIR sensor. The signal STATUS may be generated in response to motion detected by the PIR sensor 114. The number and/or type of the sensors 114 may be varied according to the design criteria of a particular implementation.

Figure 5:
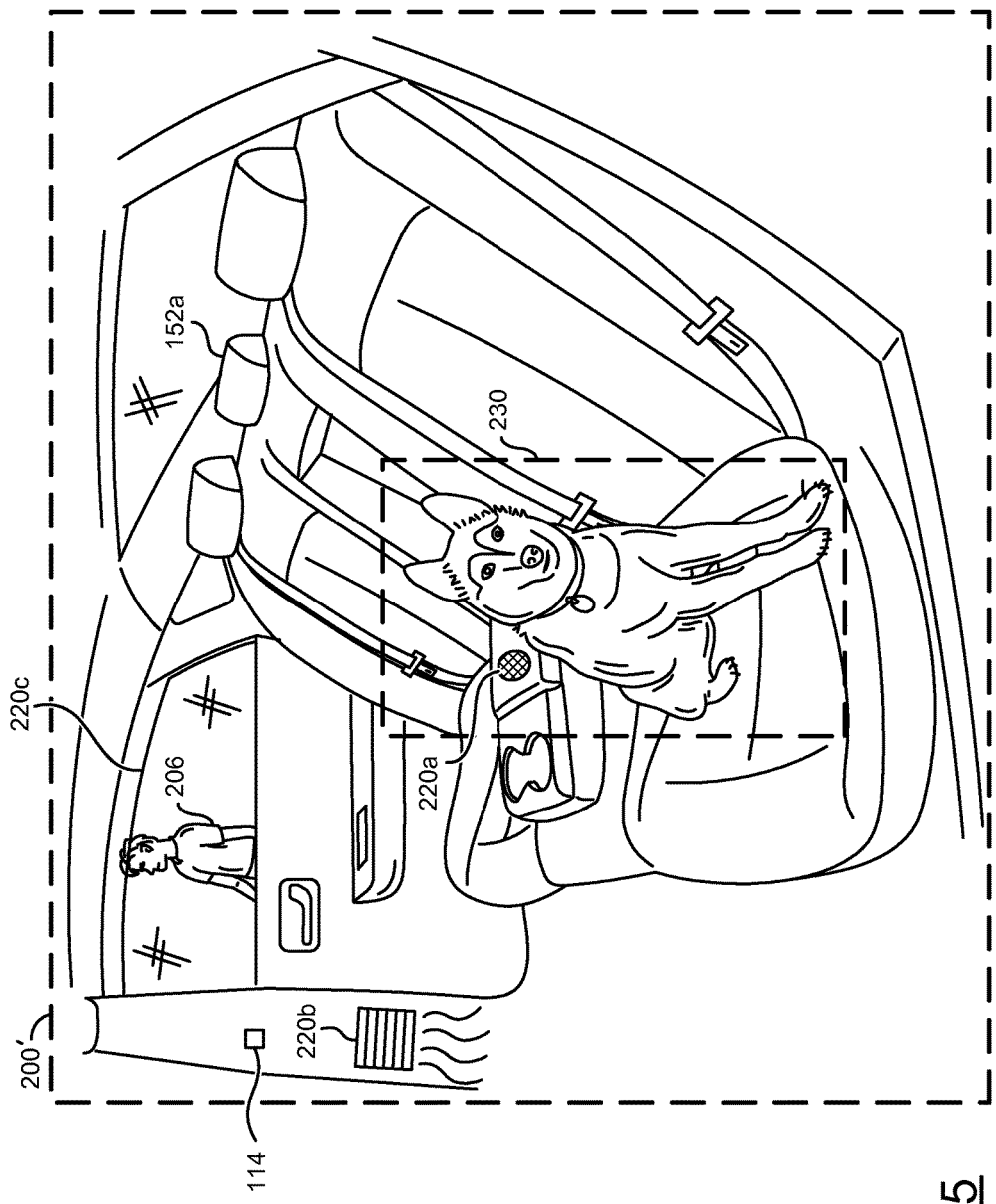
FIG. 5 is a diagram illustrating detecting a pet in a video frame.

Referring to FIG. 5, a diagram illustrating detecting a pet in the video frame 200' is shown. One of the detected objects 230 is shown in the video frame 200'. The detected object 230 is shown as a pet (e.g., a dog). The dog 230 is shown seated in the back row of seats 152a. The window 220c is shown lowered as the corrective measure in response to the dog 230 being detected.

In some embodiments, the camera system 100 may be processing the video frame 200' and detect the object 230. For example, the dog 230 may be motionless and the camera system 100 may be configured to compare the frame 200' with the reference frame 200. The reference empty seat 204 may be compared with the seat occupied by the dog 230. The camera system 100 may detect the dog 230 based on differences in the comparison.

In some embodiments, the camera system 100 may not be actively processing and/or recording video. For example, the camera system 100 may be idle and/or turned off. The sensors 114 may be used to activate and/or wake up the camera system 100. For example, if the sensor 114 is the PIR sensor, movement by the dog 230 may be detected by the sensor 114 and the signal STATUS may be used to activate recording and/or video processing. In another example, if the sensor 114 is the CO2 sensor, CO2 exhaled by the dog 230 may be detected by the sensor 114 and the sensor STATUS may be used to activate recording and/or video processing.

The type of the object 230 may be determined by the camera system 100. For example, the object 230 may be classified as a dog. The corrective measure may be selected based on the type of the object 230. For example, the two way speaker 220a may not be activated as the corrective measure since the object 230 is a dog (e.g., the object 230 is unable to understand or respond to a message). In another example, the temperature control vent 220b may be a suitable corrective measure to reduce the temperature in the vehicle 50. In yet another example, lowering the window 220c may be a suitable corrective measure but lowering the window 220c more than a crack may allow the dog 230 to run away. The amount of the corrective measure to apply may also be determined based on the type of object detected.

Figure 6:
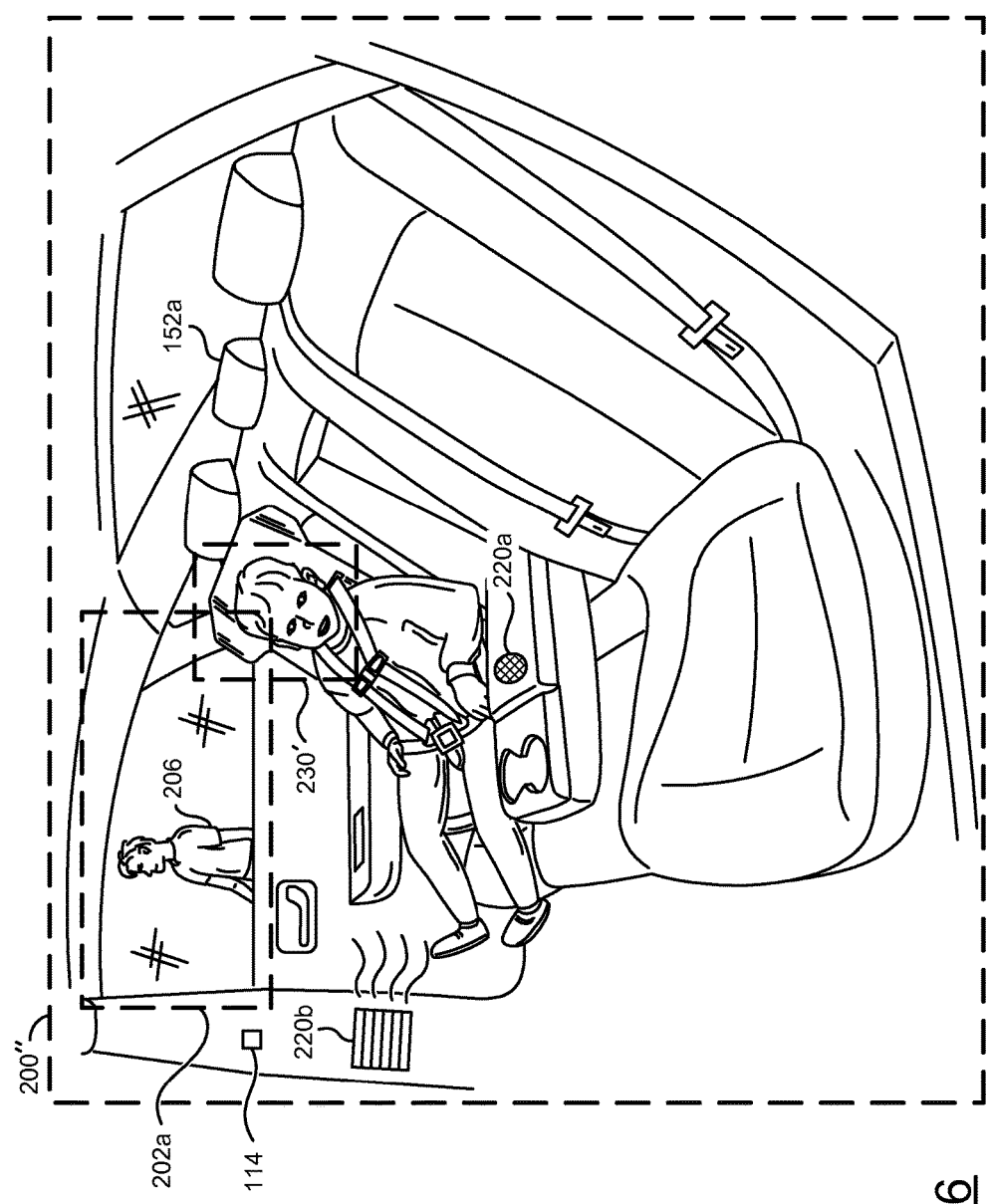
FIG. 6 is a diagram illustrating detecting a child in a video frame.

Referring to FIG. 6, a diagram illustrating detecting a child in the video frame 200" is shown. One of the detected objects 230' is shown in the video frame 200". The detected object 230' is shown as a small child. The small child 230' is shown seated in the back row of seats 152a. One or more of the corrective measures 220a-220c may be activated in response to detecting the small child 230'. For example, the temperature control vent 220b is shown directing the air flow towards the small child 230'.

The location of the detected window 202a and the location of the detected object 230' is shown partially overlapping. For example, a portion of the head of the small child 230' is shown in front of the window 202a. The camera system 100 may be trained to learn the location of the detected window 202a in the vehicle 50.

The camera system 100 may be configured to distinguish between objects interior to the vehicle 50 (e.g., the small child 230') and objects exterior to the vehicle 50 (e.g., the person 206). For example, depth-sensing techniques may be implemented to determine which of the objects detected in the video frame 200" are inside the vehicle 50. In one example of a depth-sensing technique, the camera system 100 may be configured to inspect a visibility of the outline of the detected window 202a to determine whether an object is occluding (e.g., blocking) the detected window 202a (e.g., the object is in front of the window and therefore inside the vehicle 50) or not (e.g., the object is behind the window and therefore outside of the vehicle 50). Another example of a depth-sensing technique may compare knowledge of the dimensions of the vehicle 50 to the location of the object 230' (or the person 206). The method of determining whether the detected object 230' is in front of or behind the detected window 202a may be varied according to the design criteria of a particular implementation.

Objects behind the window 202a (e.g., outside of the vehicle 50 such as the person 206) may be filtered out and/or ignored (e.g., not one of the detected objects 230). Objects in front of the window 202a (e.g., inside of the vehicle 50 such as the small child 230') may be one of the detected objects 230. Corrective measures may be applied to the detected objects 230 but not the ignored and/or filtered out objects.

The corrective measures 220a-220c may be implemented, activated and/or controlled by the processor 106 via the signal CONTROL. The corrective measures 220a-220c may be activated and/or controlled in response to a type of the object 230. The processor 106 may be configured to classify the object 230 as a particular type of object (e.g., a child, a pet, an adult, an elderly person, a differently abled person, a perishable item, etc.). The types of object classifications and/or the available corrective measures in response to each type of object classification may be varied according to the design criteria of a particular implementation.

The corrective measures 220a-220c may be automatic responses by the vehicle 50 implemented to improve a safety and/or comfort level of the detected objects 230. For example, if the detected object 230 is an unconscious person in the vehicle 50, the corrective measure may be sending an alert to emergency services. In another example, the corrective measure may be sending an alert to a driver and/or vehicle owner. The processor 106 may send the signal CONTROL to the communication device 110 to initiate communications (e.g., the communication device 110 may be one of the corrective measures).

The corrective measures 220a-220c may be used to respond to the detected object 230. In some embodiments, the corrective measures 220a-220c may be used to determine (e.g., test a hypothesis) the type of the detected object. For example, the two way speaker 220a may be used to prompt a response from the detected object 230 in order to classify the ability and/or responsiveness of the detected object 230.

The particular corrective measures the vehicle 50 uses may depend on the particular problem determined (e.g., the classification of the type of the object 230). The particular corrective measure used may be discontinued as the situation for the object 230 improves (e.g., the temperature control 220b may be activated temporarily to cool off the interior of the vehicle 50). In some embodiments, the processor 106 may constantly (or continually or periodically) apply the corrective measure. For example, in freezing temperatures, the corrective measure may be a constant warm temperature to prevent a trapped person from freezing. The camera system 100 may continue to monitor the object 230 to update the classification of the object 230 as a feedback mechanism (e.g., from a freezing person to a capable person). Since a feedback mechanism is implemented, the processor 106 may correct one or more assumptions regarding the health and/or safety of the detected object 230.

Corrective measures may start to be applied as soon as the vehicle 50 is left unattended. The camera system 100 may detect and/or classify the objects when the vehicle 50 is attended and/or unattended. The camera system 100 may determine when the vehicle 50 is unattended based on the detected objects and/or classification performed by the processor 106. If the camera system 100 determines the vehicle 50 is unattended, the camera system 100 may determine whether there is something (e.g., an object) worth responding to (e.g., applying a corrective measure in response to a child being left behind).

Generally, there may be no safety issue when the vehicle 50 is attended by a person capable of operating the accessories in the vehicle (e.g., windows, door locks, doors, temperature controls, etc.). In one example, the person capable of operating the accessories may be an adult and/or the driver. In another example, the person capable of operating the accessories may be a young adult, or teenager, that may not yet be able to legally drive. For example, the driver leaving the vehicle 50 (where the vehicle 50 detects the key fob), removing the ignition key, using an external app, etc., may start the correction process (e.g., an activation and/or confirmation signal).

Whether a person in the vehicle 50 is a person capable of operating the accessories of the vehicle 50 may be determined by the camera system 100. For example, the processor 106 may perform video analytics on the video frame 200 and/or other video signals. The video analytics may process the video frame 200 and/or other video signals for biometric markers to determine whether a person is a person capable of operating the accessories of the vehicle 50. For example, one or more of age, height and/or weight may be biometric markers used to determine whether a person is a person capable of operating the accessories of the vehicle 50. The biometric markers may be used to differentiate between a child, an adolescent, etc. (e.g., a person who may not be capable of operating the accessories of the vehicle 50) and a young adult, teenager, adult, etc. (e.g., a person who may be capable of operating the accessories of the vehicle 50).

In some embodiments, the age, height, weight and/or other biometric markers (e.g., attributes) used to determine whether a person is capable of operating the accessories of the vehicle 50 may be similar to attributes used in regulations for sitting in the front seat of a vehicle and/or other vehicle safety regulations. Various biometric markers may be stored as reference data in the lookup table 116. For example, the lookup table 116 may store different heights, weights, ages, etc. applicable to different regions (e.g., based on different regulations in a particular region). The types of video analytics performed to determine whether a person is capable of operating the accessories of the vehicle 50 may be varied according to the design criteria of a particular implementation.

The vehicle may be determined to be unattended when the driver leaves the vehicle 50 and/or there is no supervision by a person capable of operating the accessories of the vehicle 50. For example, corrective measures may be applied when the driver leaves the vehicle 50 for a particular amount of time (e.g., corrective measures should be applied when a driver leaves the car to go shopping). In another example, corrective measures may not be applied when the driver leaves the vehicle 50 for a short amount of time and/or does not travel farther than a particular distance (e.g., correction should not be applied when the driver leaves the vehicle 50 to fill up at a gas pump). However, if the status information indicates a safety issue (e.g., even though the driver is in close proximity) a corrective measure may be activated (e.g., the windows may be rolled down if the temperature increases).

In some embodiments, the camera system 100 may store data (e.g., in the memory 108) corresponding to people and/or objects in the vehicle 50 while the vehicle 50 is in operation. The data corresponding to the objects in the vehicle 50 may be compared to data corresponding to the objects after the vehicle has stopped (e.g., is parked) to determine whether the vehicle 50 is attended by a person capable of operating the accessories of the vehicle 50. For example, if there was an adult operating the vehicle 50 and, after the vehicle 50 is parked, the adult is no longer detected, then the vehicle 50 may be considered unattended. The method of determining whether the vehicle 50 is unattended may be varied according to the design criteria of a particular implementation.

The processor 106 may be used to differentiate between various types of objects (e.g., classify the objects 230). For example, video analytics may be performed to determine an age of the detected person 230 as part of the classification of the objects. The apparatus 100 may implement an integrated process that combines differentiating and/or attempting to improve the condition/health of the detected person 230 iteratively. For example, asking for a response from the speaker 220a may test the "hypothesis" that the detected object 230 is a responsive adult.

The corrective measures 220a-220c may be implemented as part of a "diagnosis" (e.g., classification of the objects 230).

The response of the objects 230 to the corrective measures 220a-220c may increase or decrease a confidence level of the classification. For example, a lack of response from the detected object 230 may increase the confidence level that the detected object 230 is unresponsive. The response of the object 230 (e.g., regaining consciousness in response to lowering the temperature in the vehicle 50) to the corrective measure may increase the confidence level (e.g., provide a confirmation) of the classification.

The capture device 102 may be configured to capture video image data (e.g., from the lens 112). In some embodiments, the capture device 102 may be a video capturing device such as a camera. In some embodiments, the capture device 102 may be a component of a camera (e.g., a camera pre-installed at a fixed location such as a security camera). The capture device 102 may capture data received through the lens 112 to generate a bitstream (e.g., generate video frames). For example, the capture device 102 may receive light from the lens 112. The lens 112 may be directed, panned, zoomed and/or rotated to provide a targeted wide angle view of the interior of the vehicle 50 (e.g., a field of view).

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the targeted view of the interior of the vehicle 50 may be represented as the signal/bitstream/data VIDEO (e.g., a digital video signal). The capture device 102 may present the signal VIDEO to the processor 106. The signal VIDEO may represent the video frames/video data (e.g., the video frame 200). The signal VIDEO may be a video stream captured by the capture device 102. In some embodiments, the capture device 102 may be implemented in the camera. In some embodiments, the capture device 102 may be configured to add to existing functionality of the camera.

In some embodiments, the capture device 102 may be pre-installed at a pre-determined location (e.g., an interior ceiling of the vehicle 50) and the camera system 100 may connect to the capture device 102. In other embodiments, the capture device 102 may be part of the camera system 100. The capture device 102 may be configured for driver monitoring, security monitoring, passenger monitoring, for insurance purposes, etc. For example, the capture device 102 may be implemented to detect break-ins and/or vandalism. In another example, the capture device 102 may detect accidents to provide evidence for insurance claims. In yet another example, the capture device 102 may detect a status of the driver (e.g., drowsiness).

The capture device 102 may be configured to detect faces in a region of a video frame. In some embodiments, the capture device 102 may be configured to recognize faces through facial recognition (e.g., based on faces stored as references in the memory 108). In some embodiments, the capture device 102 may be configured to detect objects and classify the objects as a particular type of object (e.g., an elderly person, a child, an animal, etc.). The camera system 100 may be configured to leverage pre-existing functionality of the pre-installed capture device 102. The implementation of the capture device 102 may be varied according to the design criteria of a particular implementation.

In some embodiments, the capture device 102' may implement the camera sensor 120 and/or the processor 122. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the objects 230. For example, the processor 122 may analyze the captured bitstream (e.g., using machine vision processing), determine a location of the detected objects 230 and present the signal VIDEO (e.g., comprising information about the location of the detected objects 230) to the processor 106. The processor 122 may be configured to determine the location of the detected objects 230 (e.g., less analysis is performed by the processor 106). In another example, the processor 122 may generate the signal VIDEO comprising video frames and the processor 106 may analyze the video frames to determine the location of the detected objects 230 (e.g., more analysis is performed by the processor 106). The analysis performed by the processor 122 and/or the processor 106 may be varied according to the design criteria of a particular implementation.

In some embodiments, the processor 122 may be implemented as a local processor for the camera system 100 and the processor 106 may be implemented as an external processor (e.g., a processor on a device such as a server on a server farm). The processor 122 may be configured to combine the signal VIDEO and the signal STATUS for storage in the memory 108 (e.g., embed the status information, objects 230 and/or metadata associated with the video frames in the video file as a text track, control channel, RTP stream, etc.). The camera system 100' may be configured to transmit the signal VIDEO with embedded status information to an external device (e.g., a device on an external network). The external device may have an external version of the processor 106 configured to perform the detection of the objects 230 and/or the determination of the corrective measures to initiate in response to the detected objects 230.

The interface 104 may receive data from one or more of the sensors 114. The signal STATUS may be generated in response to the data received from the sensors 114 at a time of generation of the signal VIDEO. In some embodiments, the interface 104 may receive data from a location module. In some embodiments, the interface 104 may receive data from an orientation module. In some embodiments, the interface 104 may receive data from a temperature module. In some embodiments, the interface 104 may receive weather information scraped from an external source (e.g., a weather service and/or website). In some embodiments, the interface 104 may receive data from the processor 106 (e.g., the signal CONTROL) and/or the communication device 110. The interface 104 may send data (e.g., instructions) from the processor 106 to connected devices via the communications device 110. For example, the interface 104 may be bi-directional.

In the examples shown (e.g., in FIG. 1 and FIG. 2), information from the sensors 114 (e.g., the location module, the PIR sensor, the $CO_2$ sensor, the temperature module, etc.) may be received by the interface 104. In one example, where the camera system 100 is installed in the vehicle 50, the interface 104 may be implemented as an electronic bus (e.g., a controller area network (CAN) bus) and the sensors 114 may be part of the vehicle 50. In another example, the interface 104 may be implemented as an Ethernet interface. In yet another example, the interface 104 may be implemented as an electronic device (e.g., a chip and/or a circuit board) with a CAN bus controller. In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input from and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the objects 230 in the video frame 200. In some embodiments, the processor 122 may be configured to detect the objects 230 and the processor 106 may receive the location (or coordinates) of the detected objects 230 in the video 200 frame from the capture device 102'. In some embodiments, the processor 106 may be configured to analyze the video frame 200 (e.g., the signal VIDEO). The processor 106 may be configured to detect a location and/or position of the detected objects 230 in the video frame 200.

The processor 106 may determine a type of the detected objects 230 based on a classification. The classification may be based on information from the signal VIDEO (e.g., object detection) and/or information from the signal STATUS (e.g., environmental factors). For example, the color histogram, the high frequency component and/or video analytics of the signal VIDEO may be compared to some known reference. In another example, temperature and/or humidity information may be provided by the signal STATUS (e.g., to distinguish a cold person from a hot person). The processor 106 may rule out and/or increase a likelihood of certain types of objects. For example, the classification may comprise a confidence level for a particular hypothesis (or diagnosis) about the condition (e.g., capability) of the detected object 230.

A high confidence level for a particular type of object may indicate that evidence (e.g., from the signal VIDEO and/or STATUS) is consistent with the particular type of object. A low confidence level for a particular type of object may indicate that evidence (e.g., from the signal VIDEO and/or STATUS) is inconsistent with the particular type of object. Various checks may be performed to determine the confidence level. The corrective measures 220a-220c may be activated when a confidence level is above a pre-defined threshold. The implementation of the classification to determine the type of object may be varied based on the design criteria of a particular implementation.

Based on the location and/or the classification of the detected objects 230 in the video frame 200 (e.g., the signal VIDEO), the processor 106 may determine the appropriate response and/or corrective measure for the type of the objects 230. The corrective measures for the detected objects 230 may be based on the signal VIDEO and/or the signal STATUS. The processor 106 may generate the signal CONTROL in response to the determined (or selected) corrective measures for the detected objects 230. The corrective measures may be an automatic response performed by components of the vehicle 50 in response to the signal CONTROL.

The signal CONTROL may be implemented to provide an activation for the corrective measures in response to the classification of the objects 230. For example, the signal CONTROL may be sent to the interface 104 in order to activate the appropriate device to initiate the corrective measure (e.g., temperature control systems, windows, the communication device 110, an alert to a user device, etc.). Generally the signal CONTROL may correspond to the type of the classified objects 230.

The utilization of the data stored in the signal CONTROL may be varied according to the design criteria of a particular implementation. In some embodiments, the signal CONTROL may be presented to the communication device 110 and the communication device 110 may pass the signal CONTROL to an external network and/or external storage. For example, if the object 230 is an unconscious person, the signal CONTROL may be sent to an emergency service (e.g., police department, fire department, ambulance services, etc.).

The processor 106 and/or the processor 122 may be implemented as an application specific integrated circuit (e.g., ASIC) or a system-on-a-chip (e.g., SOC). The processor 106 and/or the processor 122 may be configured to determine a current size, shape and/or color of the objects 230 (e.g., to perform a classification). The processor 106 and/or the processor 122 may detect one or more of the objects 230 in each video frame. In some embodiments, the processor 106 and/or the processor 122 may receive video signals from multiple cameras and/or image sensors.

The processor 106 and/or the processor 122 may determine a number of pixels (e.g., a width, a height and/or a depth) comprising the detected objects 230 in the video frame 200. Based on the number of pixels of each of the detected objects 230 in the video frame 200, the processor 106 and/or the processor 122 may estimate a classification of the detected objects 230. Whether the detection of the objects 230 is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 (e.g., the data storage portion 118) may correspond to the detected objects 230, reference objects (e.g., the reference empty seat 204), the windows 202a-202b, a video file, status information (e.g., readings from the sensors 114) and/or metadata information.

For example, the memory 108 (e.g., the lookup table 116) may store a reference size (e.g., the number of pixels of an object of known size in a video frame 200 at a known distance) of the objects 230. In another example, the memory 108 may store a reference shape (e.g., an arrangement of pixels of the reference object in the video frame at a known distance such as the reference empty seat 204). In yet another example, the memory 108 may store a reference color (e.g., a RGB value and/or a YCbCr value for each of the pixels of the reference object in the video frame 200) of the objects 230. The reference size, shape and/or colors stored in the memory 108 may be used to compare the current size of the detected objects 230 in the current video frame 200. The comparison of the size of the detected objects 230 in the current video frame 200 and the reference size, shape and/or color may be used to estimate a classification of the objects 230.

The memory 108 may store the pre-determined location of the camera system 100 and/or a pre-determined field of view of the camera system 100 (e.g., when the camera system 100 is implemented as a fixed view camera). The memory 108 may store reference data for the objects 230. For example, the memory 108 may store reference color histograms for various known types of objects. In another example, the memory 108 may store previously captured frames (e.g., a reference image from when a car was parked, a reference image from when a car was in operation, turned off and/or left unattended). The type of reference information stored by the memory 108 may be varied according to the design criteria of a particular implementation.

The memory 108 may store the lookup table 116. The lookup table 116 stored in the memory 108 may comprise reference information. The lookup table may allow the signal VIDEO and/or the signal STATUS to be compared to and/or cross-referenced with some known set of data. Generally, the lookup table 116 may be implemented to index precalculated values to save computation time.

For example, the lookup table 116 may store temperature values, and/or humidity values. The detected temperature and/or humidity values may be compared to values in the lookup table 116 to perform a classification of the objects 230 and/or activate one of the corrective measures. For example, some types of objects 230 may be able to withstand higher temperatures and/or humidity levels. In one example, data values for the lookup table 116 may be scraped (e.g., using the communication device 110) from a weather service (e.g., to determine an amount of time before the temperature reaches dangerous levels). In another example, data values for the lookup table 116 may be precalculated (e.g., during an idle time of the processor 106).

The communication device 110 may send and/or receive data to/from the interface 104. In some embodiments, the communication device 110 may be implemented as one or more of the corrective measures (e.g., sending alerts to the user device, contacting emergency services, transmitting confirmations to alerts, etc.). In some embodiments, when the camera system 100 is implemented as a vehicle camera, the communication device 110 may be the on-board diagnostics (OBD) of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lens 112 (e.g., a camera lens) may be directed to provide a targeted wide angle view of the interior of the vehicle 50 (e.g., a field of view of the capture device 102). In one example, the lens 112 may be mounted on a dashboard of the vehicle 50. In another example, the lens 112 may be mounted to the interior ceiling of the vehicle 50. In yet another example, the lens 112 may be mounted to a door panel of the vehicle 50. The location of the lens 112 may be varied according to the design criteria of a particular implementation. The lens 112 may be aimed to capture environmental data (e.g., light). The lens 112 may be configured to capture and/or focus the light for the capture device 102. Generally, the sensor 120 is located behind the lens 112.

Based on the captured light from the lens 112, the capture device 102 may generate a bitstream and/or video data.

The sensors 114 may be configured to determine a location and/or an orientation of the camera system 100. The number and/or types of data used to determine the location and/or orientation of the camera system 100 may be varied according to the design criteria of a particular implementation. Other types of sensors may be implemented. For example, a temperature module may be implemented to determine an inside and/or an outside temperature for the vehicle 50. In another example, a $CO_2$ sensor may be implemented to detect breathing in the vehicle 50. In yet another example, a PIR sensor may be implemented to detect motion in the vehicle 50. In still another example, a humidity sensor may be implemented to determine a humidity level of the environment.

Data from the sensors 114 may be presented to the processor 106 as the signal STATUS. The number and/or types of the sensors 114 may be varied according to the design criteria of a particular implementation. The sensors 114 may be used by the camera system 100 to determine (e.g., confirm a likelihood) a type of the objects 230 (e.g., confirm classifications).

In some embodiments, the sensor information received by the sensors 114 may be used to initiate processing the video signal. For example, the camera system 100 may operate in an idle and/or sleep mode (e.g., saving power by not recording and/or processing video data). The $CO_2$ sensors may detect $CO_2$ levels that may indicate breathing in the vehicle 50. The signal STATUS may be used to wake up the camera system 100 (e.g., begin recording and/or processing). In another example, the PIR sensors may detect motion in the vehicle 50 and present the signal STATUS to wake up the processor 106.

The camera system 100 may begin processing the video signal in response to the sensor information. Generally, the camera system 100 checks for the objects 230 when the vehicle 50 is unattended. Often no objects are left in the vehicle 50. To avoid consuming power unnecessarily, the camera system 100 may remain in a standby mode until the sensors 114 detect an indication that an object may be in the vehicle 50. The sensors 114 (e.g., the $CO_2$ sensor, the PIR sensor and/or the other types of sensors) may be configured to determine whether one of the objects 230 is in the vehicle 50.

The signal STATUS may provide information for the camera system 100 (e.g., the status information). In one example, location information may be determined by the location module (e.g., to determine weather conditions for the current location of the vehicle 50). For example, the location module may be implemented as a GPS sensor. Orientation information may be determined by the orientation module. For example, the orientation module may be implemented as a magnetometer, an accelerometer and/or a gyroscope. In yet another example, temperature information may be determined by the temperature module. For example, the temperature module may be implemented as a thermometer.

The types of sensors used to implement the location module, the orientation module, the temperature module and/or any other types of sensors may be varied according to the design criteria of a particular implementation. In some embodiments, the signal STATUS may provide details about the camera system 100 (e.g., camera specifications, camera identity, the field of view 204, date, time, etc.).

Figure 7:
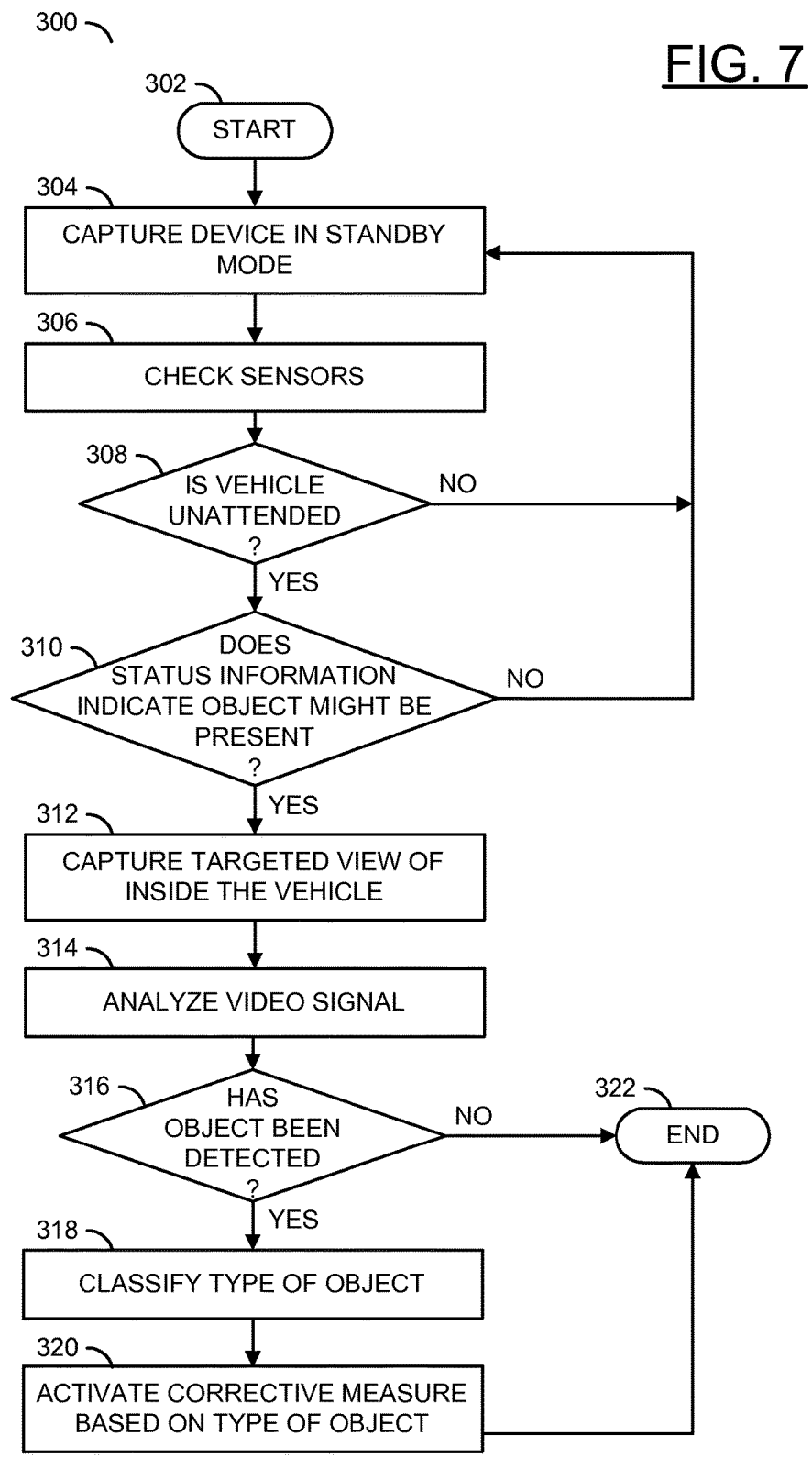
FIG. 7 is a flow diagram illustrating a method for detecting a type of object and activating a corrective measure.

Referring to FIG. 7, a method (or process) 300 is shown. The method 300 may detect a type of object and activate a corrective measure. The method 300 generally comprises a step (or state) 302, a step (or state) 304, a step (or state) 306, a decision step (or state) 308, decision step (or state) 310, a step (or state) 312, a step (or state) 314, a decision step (or state) 316, a step (or state) 318, a step (or state) 320, and a step (or state) 322.

The state 302 may start the method 300. In the state 304, the capture device 102 may be in a standby mode (e.g., an idle or power saving state). In the state 306, the processor 106 may check the sensors 114 (e.g., the signal STATUS). Next, the method 300 may move to the decision state 308.

If the decision state 308 determines the vehicle 50 is not unattended (e.g., the processor 106 does not detect a driver and/or the person capable of operating the accessories of the vehicle), the method 300 may return to the state 304. If the decision state 308 determines the vehicle 50 is unattended, the method 300 may move to the decision state 310. If the decision state 310 determines the status information does not indicate an object might be present (e.g., based on an analysis of the data captured by the sensors 114 by the processor 106), the method 300 may return to the state 304. If the decision state 310 determines the status information does indicate an object might be present, the method 300 may move to the state 312.

In the state 312, the capture device 102 may capture a targeted view of the inside of the vehicle 50. In the state 314, the processor 106 may analyze the signal VIDEO (e.g., the video frame 200). Next, the method 300 may move to the decision state 316.

If the decision state 316 determines an object has been detected (e.g., the processor 106 detects the object 230 in the video frame 200), the method 300 may move to the state 318. In the state 318, the processor 106 may classify the type of the object 230. Next, in the state 320, the processor 106 may activate the corrective measure based on the type of the object 230 (e.g., generate the signal CONTROL). Next, the method 300 may move to the state 322. If the decision state 316 determines an object has not been detected (e.g., the processor 106 does not detect any objects in the video frame 200), the method 300 may move to the state 322. The state 322 may end the method 300.

Figure 8:
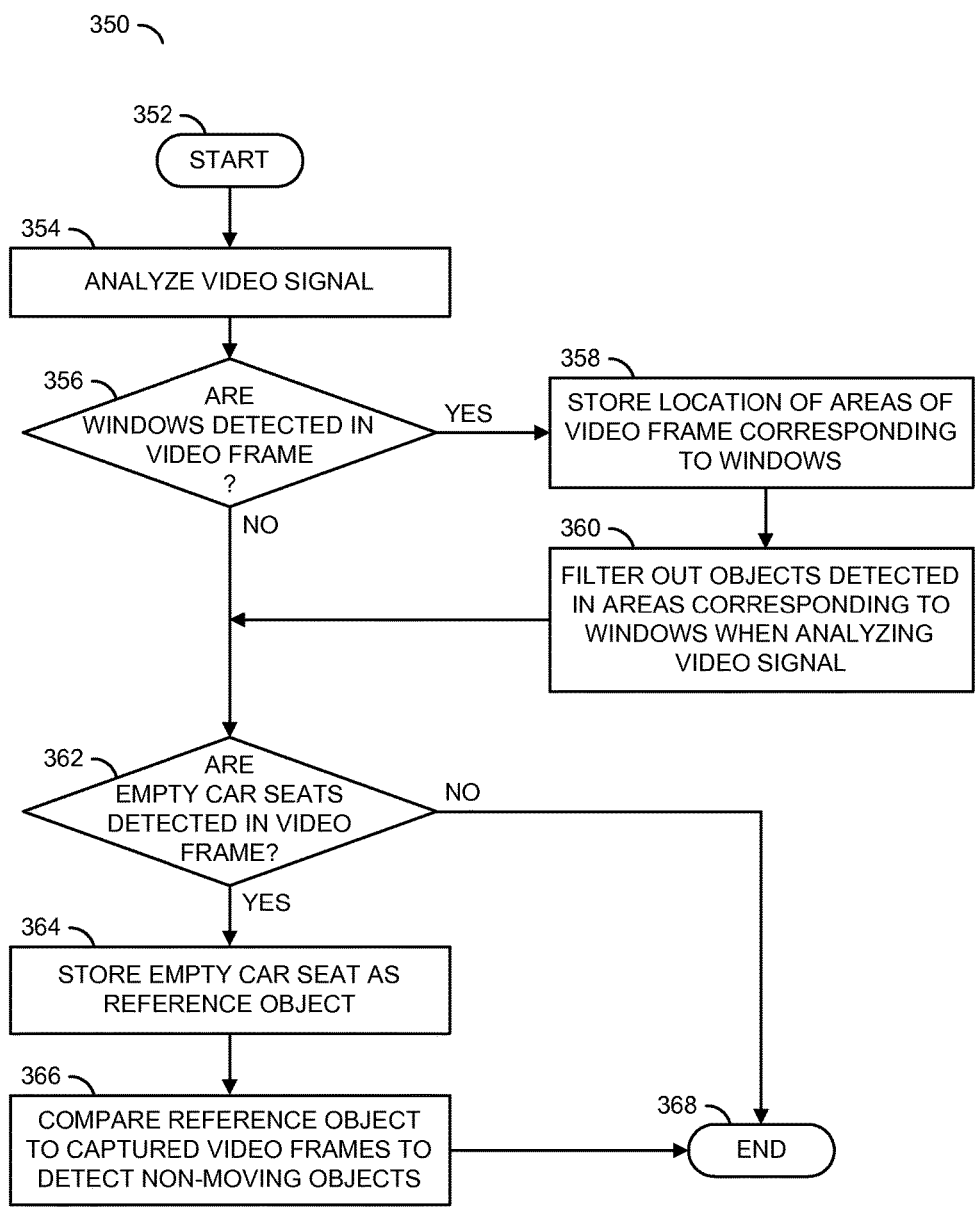
FIG. 8 is a flow diagram illustrating a method for storing reference information from a video frame.

Referring to FIG. 8, a method (or process) 350 is shown. The method 350 may store reference information from a video frame. The method 350 generally comprises a step (or state) 352, a step (or state) 354, a decision step (or state) 356, a step (or state) 358, a step (or state) 360, a decision step (or state) 362, a step (or state) 364, a step (or state) 366, and a step (or state) 368.

The state 352 may start the method 350. In the state 354, the processor 106 may analyze the video signal (e.g., the signal VIDEO). Next, the method 350 may move to the decision state 356.

If the decision state 356 determines there are windows detected in the video frame (e.g., the processor 106 determines the detected windows 202a-202b are in the video frame 200), the method 350 may move to the state 358. In the state 358, the location of the areas of the video frame 200 corresponding to the windows 202a-202b may be stored in the memory 108. Next, in the state 360, the processor 106 may filter out objects detected in areas corresponding to the detected windows 202a-202b when analyzing the video signal. Next, the method 350 may move to the decision state 362. If the decision state 356 determines there are not windows detected in the video frame (e.g., the processor 106 determines the detected windows 202a-202b are not in the video frame 200), the method 350 may move to the decision state 362.

If the decision state 362 determines there are empty car seats detected in the video frame 200 (e.g., the processor 106 determines there are empty seats in the seat rows 152a-152c), the method 350 may move to the state 364. In the state 364, the processor 106 may store video data associated with the empty car seat in the memory 108 as one of the reference objects (e.g., the reference empty seat 204). In the state 366, the processor 106 may compare the reference object to the captured video frames (e.g., the signal VIDEO) to detect non-moving objects. Next, the method 350 may move to the state 368. If the decision state 362 determines there are not empty car seats detected in the video frame (e.g., the processor 106 determines there are not empty seats in the seat rows 152a-152c), the method 350 may move to the state 368. The state 368 may end the method 350.

Figure 9:
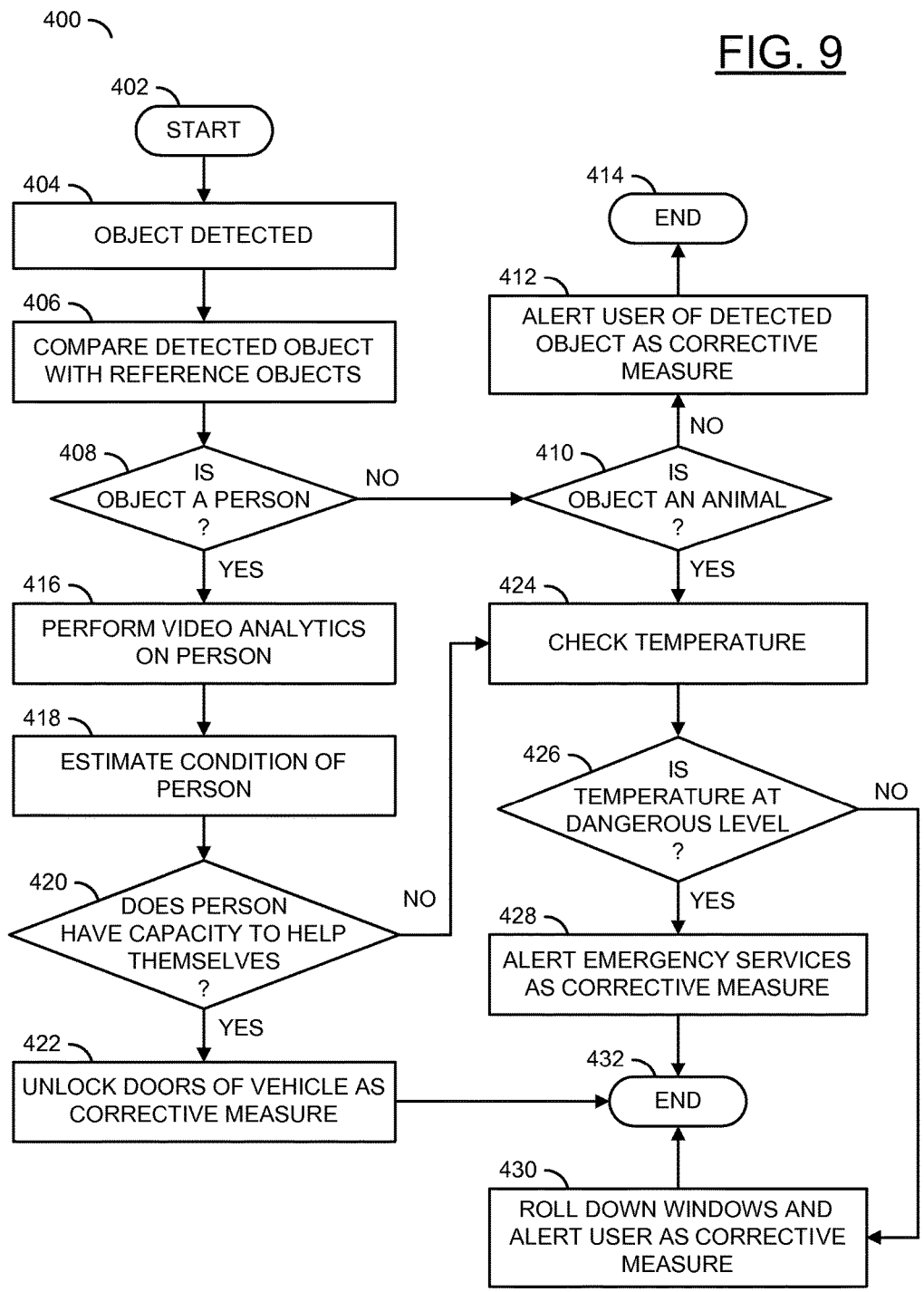
FIG. 9 is a flow diagram illustrating a method for activating a corrective measure for different types of detected objects.

Referring to FIG. 9, a method (or process) 400 is shown. The method 400 may activate a corrective measure for different types of detected objects. The method 400 generally comprises a step (or state) 402, a step (or state) 404, a step (or state) 406, a decision step (or state) 408, a decision step (or state) 410, a step (or state) 412, a step (or state) 414, a step (or state) 416, a step (or state) 418, a decision step (or state) 420, a step (or state) 422, a step (or state) 424, a decision step (or state) 426, a step (or state) 428, a step (or state) 430, and a step (or state) 432.

The state 402 may start the method 400. In the state 404, the processor 106 may detect the object 230. In the state 406, the processor 106 may compare the detected object 230 with the reference objects (e.g., the reference objects stored in the memory 108). Next, the method 400 may move to the decision state 408.

If the decision state 408 determines the detected object 230 is not a person (e.g., based on the classification performed by the processor 106), the method 400 may move to the decision state 410. If the decision state 410 determines the object is not an animal (e.g., based on the classification performed by the processor 106), the method 400 may move to the state 412. In the state 412, the processor 106 may alert the user (e.g., using the communication device 110) of the detected object 230 as the corrective measure. Next, the method 400 may end in the state 414. If the decision state 410 determines, the object is an animal (e.g., based on the classification performed by the processor 106), the method 400 may move to the state 424. If the decision state 408 determines the detected object 230 is a person (e.g., based on the classification performed by the processor 106), the method 400 may move to the state 416.

In the state 416, the processor 106 may perform video analytics on the detected person 230. In the state 418, the processor 106 may estimate a condition of the detected person 230 (e.g., a classification such as unresponsive, unconscious, disabled, etc.). Next, the method 400 may move to the decision state 420.

If the decision state 420 determines the detected person 230 does have the capacity to help themselves, the method 400 may move to the state 422. In the state 422, the processor 106 may unlock the doors of the vehicle as the corrective measure (e.g., generate the signal CONTROL). Next, the method 400 may move to the state 432. If the decision state 420 determines the detected person 230 does not have the capacity to help themselves, the method 400 may move to the state 424. In the state 424, the processor 106 may check the temperature (e.g., read a temperature measurement from the temperature sensor 114). Next, the method 400 may move to the decision state 426.

If the decision state 426 determines the temperature level is at a dangerous level (e.g., based on a comparison by the processor 106 using the lookup table 116), the method 400 may move to the state 428. In the state 428, the processor 106 may alert emergency services as the corrective measure (e.g., generate the signal CONTROL). Next, the method 400 may move to the state 432.

If the decision state 426 determines the temperature level is not at a dangerous level (e.g., based on a comparison by the processor 106 using the lookup table 116), the method 400 may move to the state 430. In the state 430, the processor 106 may roll down the window 220*c* as the corrective measure (e.g., generate the signal CONTROL). Next the method 400 may move to the state 432. The state 432 may end the method 400.

Figure 10:
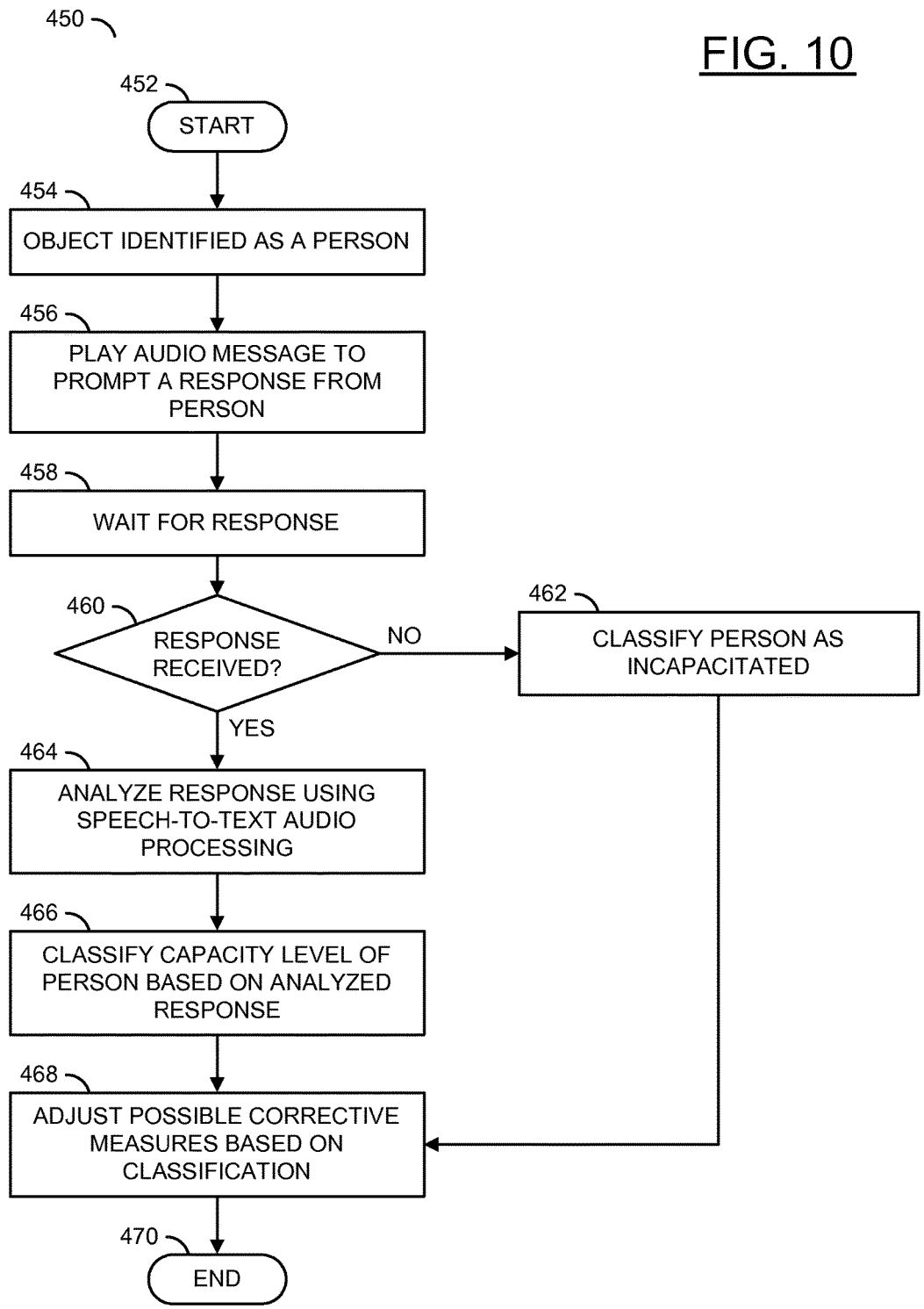
FIG. 10 is a flow diagram illustrating a method for classifying a type of object based on testing a hypothesis.

Referring to FIG. 10, a method (or process) 450 is shown. The method 450 may classify a type of object based on testing a hypothesis. The method 450 generally comprises a step (or state) 452, a step (or state) 454, a step (or state) 456, a step (or state) 458, a decision step (or state) 460, a step (or state) 462, a step (or state) 464, a step (or state) 466, a step (or state) 468, and a step (or state) 470.

The state 452 may start the method 450. In the state 454, the processor 106 may identify the object 230 as a person. In the state 456, the two way speaker 220*a* may play an audio message (based on receiving the signal CONTROL from the processor 106) to prompt a response from the detected person 230. The state 458 may wait for a response. Next, the method 450 may move to the decision state 460.

If the state 460 determines a response has not been received, the method 450 may move to the state 462. In the state 462, the processor 106 may classify the detected person 230 as incapacitated. Next, the method 450 may move to the state 468. If the decision state 460 determines a response has been received, the method 450 may move to the state 464.

In the state 464, the processor 106 may analyze the response using speech-to-text audio processing. Next, in the state 466, the processor 106 may classify a capacity level of the detected person 230 based on the analyzed response. Next, the method 450 may move to the state 468. In the state 468, the processor 106 may adjust the possible corrective measures based on the classification. Next, the method 450 may move to the state 470. The state 470 may end the method 450.

Figure 11:
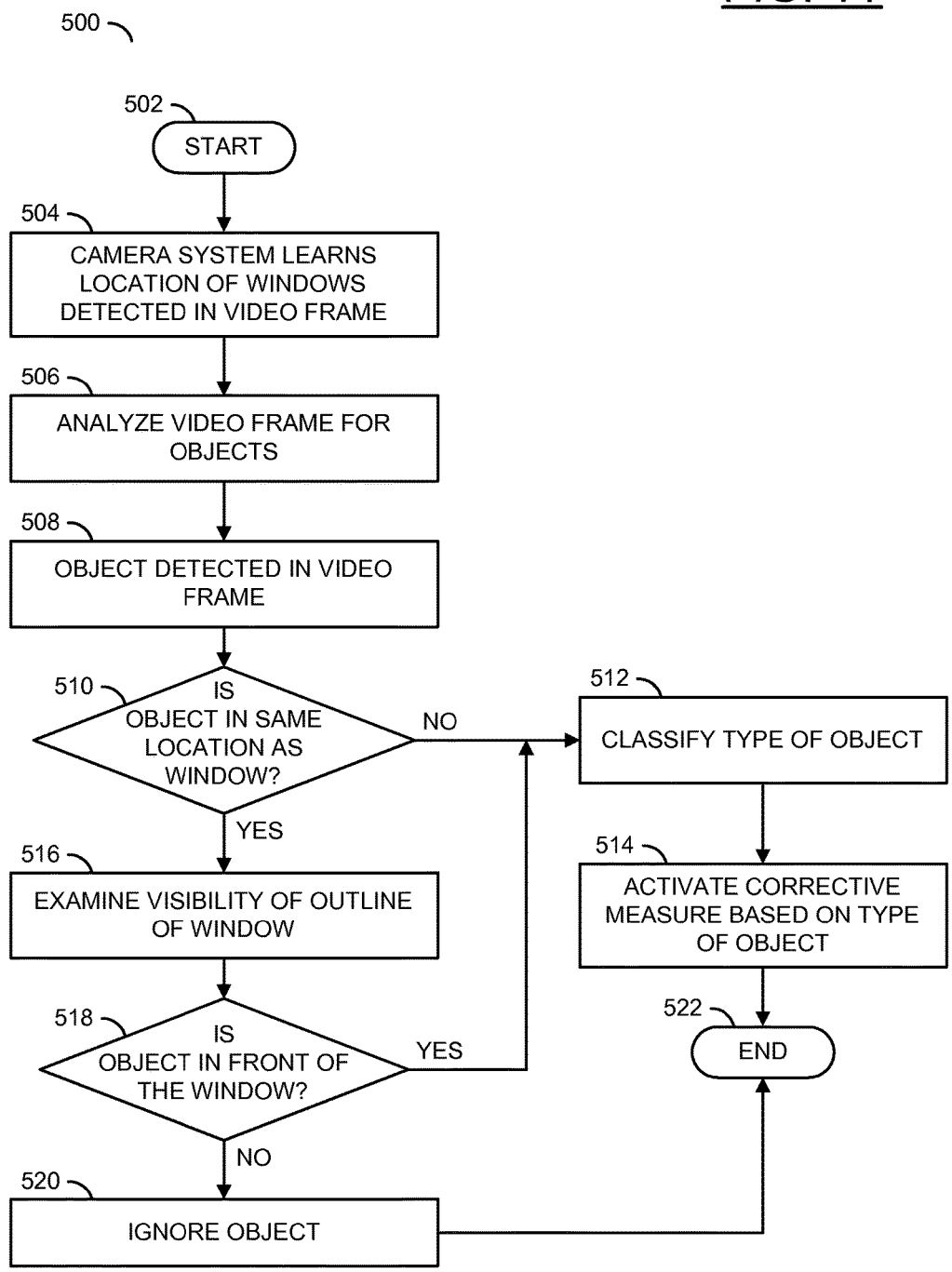
FIG. 11 is a flow diagram illustrating a method for distinguishing between objects in front of a window from objects behind a window.

Referring to FIG. 11, a method (or process) 500 is shown. The method 500 may distinguish objects in front of a window from objects behind a window. The method 500 generally comprises a step (or state) 502, a step (or state) 504, a step (or state) 506, a step (or state) 508, a decision step (or state) 510, a step (or state) 512, a step (or state) 514, a step (or state) 516, a decision step (or state) 518, a step (or state) 520, and a step (or state) 522.

The state 502 may start the method 500. In the state 504, the camera system 100 may learn the location of the windows 202*a*-202*b* detected in the video frame 200. In the state 506, the processor 106 may analyze the video frame 200 for objects. In the state 508, the processor 106 may detect the object 230 in the video frame 200. Next, the method 500 may move to the decision state 510.

If the decision state 510 determines the object 230 is not in the same location as one of the windows 202*a*-202*b* (e.g., based on the analysis performed by the processor 106), the method 500 may move to the state 512. In the state 512, the processor 106 may classify the type of the object 230. In the state 514, the processor 106 may activate the corrective measure (e.g., using the signal CONTROL) based on the type of the object 230. Next, the method 500 may move to the state 522. If the decision state 510 determines the object 230 is in the same location as one of the windows 202*a*-202*b*, the method 500 may move to the state 516.

In the state 516, the processor 106 may examine a visibility of an outline of the window (e.g., one or more of the windows 202*a*-202*b* that has the same location as the detected object 230). Next, the method 500 may move to the decision state 518. If the decision state 518 determines the detected object 230 is in front of the window (e.g., based on the analysis of the outline of the window by the processor 106), the method 500 may move to the state 512. If the decision state 518 determines the object 230 is not in front of the window, the method 500 may move to the state 520. In the state 520, the processor 106 may ignore the object (e.g., the processor 106 may not include the person 206 as one of the detected objects 230). Next, the method 500 may move to the state 522. The state 522 may end the method 500.

The camera system 100 may be used to detect a presence of the objects 230 (e.g., a child, an adult, a disabled person, an animal, a perishable item, etc.) in the vehicle 50 after the driver leaves the vehicle 50 (e.g., the vehicle 50 is left unattended). The capture device 102 may be mounted on the ceiling of the vehicle 50 with a view of the back row of seats 152*a* and/or other rows of seats 152*b*-152*c*. In some embodiments, the sensor 114 (e.g., a PIR and/or $CO_2$ sensor) may be configured to wake up the camera system 100 to begin video processing and/or recording. The camera system 100 may be linked to the internal network of the vehicle 50 (e.g., the interface 104) to provide connectivity to the communication device 110 (e.g., a 4G/LTE communications system), car windows and/or alarm systems. In some embodiments, the sensors 114 may implement a temperature sensor. For example, one or more of the sensors 114 may be part of the vehicle 50. In another example, one or more of the sensors 114 may be part of the camera system 100.

The camera system 100 may be configured to perform video analytics. The video analytics may be used to "train" the camera system 100 to know (e.g., store in the memory 108) the location (or areas) of the windows 202*a*-202*b* in the image window (e.g., the video frame 200). The video analytics performed by the processor 106 may determine whether the detected objects 230 are exterior to or interior to the vehicle 50. Motion in the areas of the video frame 200 associated with the windows 202*a*-202*b* may be ignored (e.g., motion caused by movement external to the vehicle 50 such as the person 206). In some embodiments, the objects outside the vehicle 50 may be filtered out of the signal VIDEO.

In addition to movement/activity detection, the video analytics may be used to classify the type of object 230 (e.g., the entity left behind). The camera system 100 may be configured to respond differently to different types of objects. For example, if the classified object 230 is a person, the camera system may be further configured to estimate the age of the person via video analytics.

Video analytics may be configured to tell the difference between a small child (or incapacitated person), an elderly person and/or an able adult. For example, in response to a signal from the camera system 100, the speaker 220*a* may be configured to transmit a message that prompts for a response. The speaker 220*a* (or other components of the camera system 100 and/or the vehicle 50) may be configured to listen for (e.g., receive) the response. The processor 102 may implement speech-to-text audio processing to determine the level of control the object 230 is capable of based on the response. For example, silence and/or an incoherent response (e.g., a moan, a dog barking, slurred speech, etc.) may indicate that the object is incapable of self-sufficient care.

The video analytics may be configured to determine reference objects. For example, the camera system 100 may be trained to recognize when a car seat is empty (e.g., the reference seat 204). In another example, the camera system 100 may be configured to recognize when a child, person, pet and/or a type of inanimate object is present in the seat. For example, the seat in the current video frame 200 may be compared to the reference empty seat 204. Comparing the seat in the current video frame 200 to the reference empty seat 204 may enable the camera system 100 to detect the presence of the objects 230 even if there is no motion by the objects 230.

Upon detecting the object 230 in the vehicle 50 and/or classifying the type of the object 230, the camera system may trigger one or more corrective measures. For example, the corrective measures may comprise providing an audible warning to the driver. In another example, the corrective measures may comprise triggering the alarm system of the vehicle 50 (e.g., after a pre-defined amount of time has passed). In yet another example, the corrective measures may comprise sending a text message and/or initiating a phone call to a cell phone and/or smart phone (e.g., a user device) of the driver. A notification may indicate the object 230 was left behind and/or warn about dangers associated with leaving the object 230 behind. In still another example, the corrective measures may comprise controlling windows (e.g., initiating a rolling down of the windows) to allow air flow and reduce an internal temperature of the vehicle 50.

The video analytics may be combined with the temperature data in the signal STATUS received from the sensors 114 via the interface 104 (e.g., the OBD port of the vehicle 50). In some embodiments, (e.g., in extreme and/or emergency situations such as when the temperature rises to dangerous levels and there is no response from the owner after multiple attempts) the camera system 100 may initiate contact with 911 emergency services and play an automated message (e.g., a recorded message and/or a message via a text-to-speech engine) reciting the coordinates of the vehicle 50 and the type of suspected dangerous situation as one of the corrective measures.

In some embodiments, the camera system 100 may be configured to act as a security camera. The camera system 100 may be configured to provide a warning to the driver that someone has entered the vehicle 50. For example, the camera system 100 may determine that the person 206 (e.g., the person exterior to the vehicle 50) has entered the interior of the vehicle 50. In a situation where motion and/or loud noise (e.g., breaking glass) is detected, the camera system 100 may be configured to initiate corrective measures comprising triggering a car alarm, notifying the driver via the user device (e.g., cell phone), alerting 911 and/or disabling the ignition of the vehicle 50.

The camera system 100 may be configured to provide a video and/or still image to the driver (e.g., to the user device). The driver may review the received video and/or image remotely. In some embodiments, the camera system 100 may provide communication to the user device. For example, the communication may comprise a text message (e.g., SMS message), an HTML-based message (e.g., an email, via an app, etc.), audio streaming, video streaming and/or a connection to a third party operator (e.g., an emergency service such as AAA, OnStar, etc.). The communication may be a notification. For example, the notification may warn the driver of dangers associated with leaving a child in the vehicle 50.

In some embodiments, the corrective measures may be implemented as escalating responses. The processor 106 may initiate a first corrective measure in response to the detected object. For example, rolling down the window 220c may be the first corrective measure initiated to cool down the vehicle 50. The camera system 100 may continue to monitor the video frame 200 and/or the sensors 114 to determine a response of the object 230 to the first corrective measure. For example, the detected object 230 may be sweating, which indicates that the detected object 230 is still too hot. Another corrective measure may be initiated by the camera system 100. For example, the processor 106 may initiate an activation of the temperature control 220b. The camera system 100 may continue to monitor the detected object 230 and apply other types of corrective measures. For example, if the detected object 230 is determined to still be too hot, the next corrective measure may be to contact emergency services to rescue the detected object 230.

In some embodiments, the escalating responses may comprise responding to emergency issues and non-safety issues. For example, an emergency issue may be when a baby (e.g., the child 230') is detected and the temperature is greater than a pre-determined threshold. In another example, a non-safety issue may be a perishable item being left in the vehicle 50 (e.g., food is left in the vehicle 50 after grocery shopping). Since sending false and/or unnecessary calls to emergency services is both costly and dangerous, differentiating between non-safety and emergency issues may be implemented. For example, the camera system 100 should not contact emergency services when food is accidentally left in the vehicle 50. However, sending a text message to a user device indicating groceries have been detected in the vehicle 50 may be a suitable corrective measure.

In some embodiments, emergency services may not be contacted as one of the corrective measures unless a condition has been satisfied (e.g., a confirmation signal has been received). In some embodiments, satisfying the condition may comprise a lack of confirmation. The lack of confirmation (e.g., satisfying the condition) may be an indication that emergency services should be contacted as one of the corrective measures. For example, a first escalating corrective measure may be a text message and/or audible alert sent to the user device indicating that the detected object (e.g., the child 230') has been left in the vehicle 50. Upon seeing the text message and/or hearing the audible alert the driver may realize a mistake was made and return for the child 230' and provide a confirmation that emergency services need not be contacted (e.g., calling emergency services may be unnecessary since the dangerous situation has been resolved). However, if the driver does not respond after a pre-determined amount of time, the emergency services may be contacted as the corrective measure (e.g., the situation has escalated to an emergency).

In some embodiments, a confirmation may be provided by the driver to immediately contact emergency services as the corrective measure. The confirmation from the driver may satisfy the test condition. For example, the text message transmitted to the user device may alert the driver that the child 230' has been left in the vehicle 50 and the temperature is reaching dangerous levels. If the driver is in a situation where the driver is unable to reach the vehicle 50 in time, the driver may send a confirmation signal to contact emergency services without waiting the pre-determined amount of time. For example, the driver may realize the situation is an emergency and the corrective measure may be initiated as soon as possible. The implementation of the condition to satisfy and/or the types of emergency issues may be varied according to the design criteria of a particular implementation.

In some embodiments, moving from one level of notification (e.g., corrective measure) to a higher level of notification (e.g., an emergency corrective measure) may be a lack of response. In some embodiments, the escalating responses may be used as validating a hypothesis and moving to a next stage if the hypothesis is validated. For example, the hypothesis may be that the detected object 230 is unconscious. The hypothesis may be validated by a lack of response to the pre-recorded message transmitted by the speaker 220a. The next stage of corrective measure may be contacting emergency services.

The functions performed by the diagrams of FIGS. 7-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a camera sensor configured to generate a video signal based on a targeted wide angle view of an interior of a vehicle; and
a processor configured to (A) receive a status signal indicating an environmental condition of said vehicle, (B) analyze one or more video frames of said video signal received from said camera sensor to detect an object, (C) classify a type of said object in said interior of said vehicle detected using said analysis of said video frames based on information visible in said video signal and (D) determine if said classification based on said analysis of said video frame matches an expected classification consistent with said environmental condition and (E) if said classification of said object determines that said vehicle is unattended by a person capable of operating one or more accessories of said vehicle, initiate one or more corrective measures based on said type of said object.

2. The apparatus according to claim 1, wherein said processor is further configured to (i) determine areas of said video signal that correspond to an exterior of said vehicle, (ii) determine whether said objects detected in said areas are in said exterior of said vehicle, (iii) filter objects detected in said video signal that correspond to objects outside of said vehicle and (iv) said filtered objects are not processed.

3. The apparatus according to claim 1, wherein said processor is further configured to (i) examine a visibility of an outline of a window, (ii) determine if said object is blocking said outline and (iii) determine whether said object is in said interior of said vehicle based on whether said object is blocking said outline.

4. The apparatus according to claim 1, wherein said apparatus is configured to begin processing said analysis of said video frames of said video signal in response to temperature information received from a sensor external to said apparatus through a port connected to said vehicle.

5. The apparatus according to claim 4, wherein said sensor information comprises information from at least one of (a) a PIR sensor, (b) a CO2 sensor and (c) a microphone.

6. The apparatus according to claim 1, wherein (i) said apparatus is configured to interface with components of said vehicle and (ii) said components of said vehicle comprise at least one of windows, alarm systems, communication systems and temperature control.

7. The apparatus according to claim 1, wherein (i) said camera sensor is mounted on an interior ceiling of said vehicle and (ii) said targeted wide angle view in said vehicle comprises a view of at least one of (a) a back seat row, (b) a front seat row and (c) one or more middle seat rows.

8. The apparatus according to claim 1, wherein said classification of said objects comprises determining an age of a person.

9. The apparatus according to claim 1, wherein said apparatus is further configured to (i) transmit a message that prompts for a response, (ii) receive a response and (iii) implement speech-to-text audio processing on said response to determine whether said object is capable of operating said one or more accessories of said vehicle.

10. The apparatus according to claim 1, wherein (i) said processor is further configured to determine if said object is an empty vehicle seat and (ii) detect a presence of a non-moving object if said empty vehicle seat is not detected.

11. The apparatus according to claim 1, wherein said corrective measures comprise at least one of: providing an audible warning, triggering a car alarm system, sending a message to a user device, controlling windows of said vehicle, controlling a temperature control system of said vehicle and contacting emergency services.

12. The apparatus according to claim 1, wherein (i) said apparatus further comprises a communication device, (ii) said apparatus is configured to communicate with a user device and (iii) said communication with said user device comprises at least one of a text message, an HTML-based message, audio streaming, video streaming and establishing a connection with a third party.

13. The apparatus according to claim 1, wherein said apparatus is further configured to (i) determine whether said object has entered said vehicle and (ii) if said object has entered said vehicle, initiate one or more of said corrective measures.

14. The apparatus according to claim 1, wherein said processor is further configured to generate a control signal to initiate said corrective measures.

15. The apparatus according to claim 1, wherein (i) said corrective measures comprise escalating responses comprising (a) said corrective measures corresponding to non-safety issues and (b) said corrective measures corresponding to emergency issues and (ii) said corrective measures corresponding to said emergency issues are activated in response to satisfying a condition.

16. The apparatus according to claim 1, wherein said corrective measures comprise escalating responses comprising (i) initiating a first type of said corrective measures, (ii) determining a response to said first type of said corrective measures and (iii) initiating a second type of said corrective measures.

17. The apparatus according to claim 1, wherein said types of said objects comprise at least one of an adult, a disabled person, a child, an animal and perishable items.

18. The apparatus according to claim 1, wherein said apparatus is configured as an automobile video camera for detection of at least one of children, people and pets left in said vehicle.

19. The apparatus according to claim 1, wherein said processor classifies said object by (i) storing a reference video frame and (ii) comparing a current video frame of said received video frames to said reference video frame.

20. The apparatus according to claim 1, wherein said processor is further configured to differentiate between said types of said object by processing said video frames for biometric markers of said object.

* * * * *